June 6, 1950 C. H. STOWE 2,510,840
DIE FOR MOLDING WASHERLIKE OBJECTS
Filed Oct. 12, 1945 2 Sheets-Sheet 1

Inventor
Clarence H. Stowe

June 6, 1950            C. H. STOWE            2,510,840
DIE FOR MOLDING WASHERLIKE OBJECTS
Filed Oct. 12, 1945            2 Sheets-Sheet 2
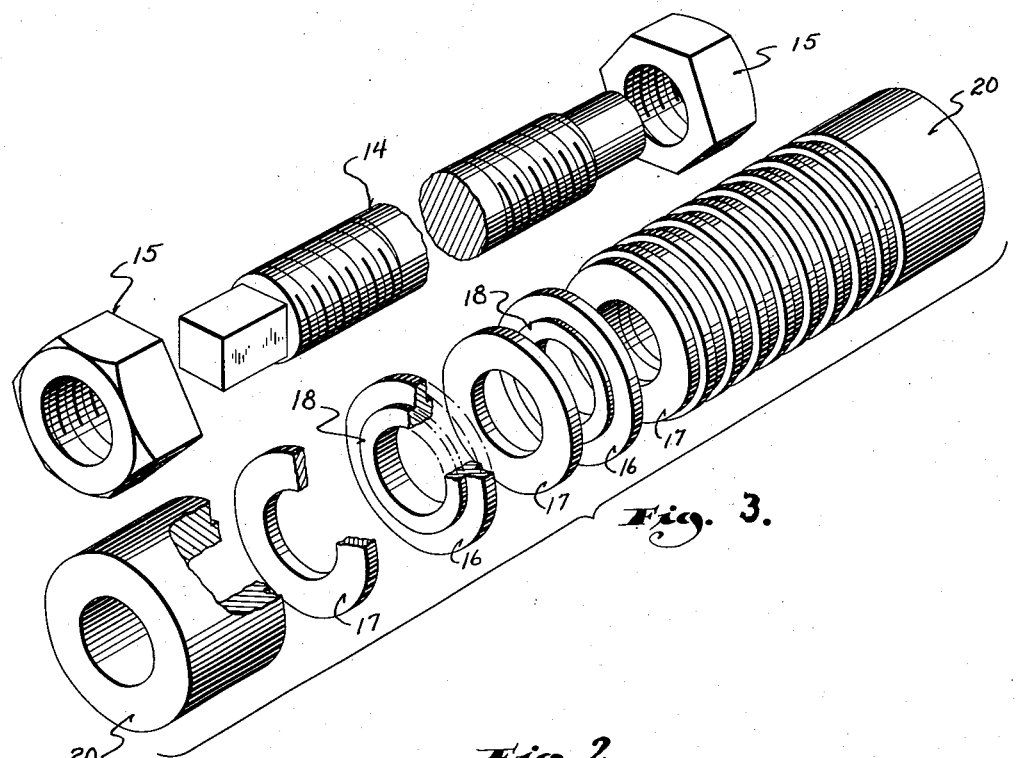
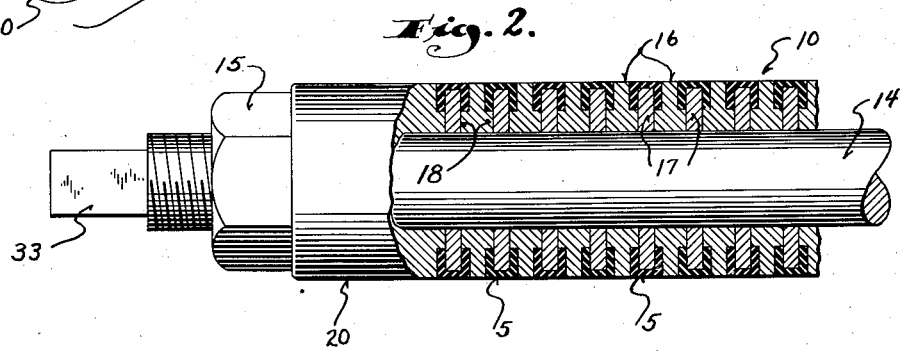
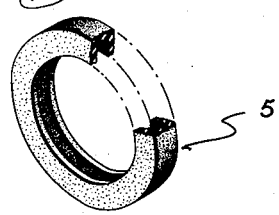
Inventor
Clarence H. Stowe
By
Attorney Patented June 6, 1950

2,510,840

UNITED STATES PATENT OFFICE 2,510,840

DIE FOR MOLDING WASHERLIKE OBJECTS

Clarence H. Stowe, Milwaukee, Wis.

Application October 12, 1945, Serial No. 621,945

6 Claims. (Cl. 18—34)

This invention relates to the art of molding washer-like objects from rubber or other suitable moldable material and refers more specifically to an improved apparatus for molding grommets having a shape distinguishing from the conventional in that their substantially radially disposed faces are directed inwardly from an outer unbroken peripheral portion of the grommet.

Hence, it will be apparent that the grommets with which this invention is concerned are adapted to be applied over the peripheries of the objects with which they are associated and which may comprise electrical equipment and the like requiring the grommets to be formed of an insulating material such as rubber.

In the past such grommets with inwardly directed flanges were formed by pressing a punch having a substantially mushroom-shaped head into a mold cavity in a die to force rubber-like material therein around the rim on the head of the punch and inwardly beneath the head or rim toward the neck connecting the head with the punch. Heat is also required to reduce the rubber-like material to a plastic state in the molding operation.

Several disadvantages make this method of forming grommets highly objectionable. In the pressing operation to form a grommet about the mushroom-like head of the punch the head of the punch often becomes bent out of shape due to the pressure which must be exerted in the process.

The inability of molding apparatus of this type to accommodate excess molding material is partly responsible for the excessive pressures to which the punches are subjected and which lead to their being forced out of shape in use. Also, an objectionable thickness of flash on the objects molded results from the inability of the molding apparatus to accommodate such excess molding material.

Moreover, finished or completed grommets cannot be molded with present apparatus inasmuch as the unavoidable flash adhering to the grommets requires the same to be subjected to a number of trimming operations. These trimming operations include the stamping out of one flat wall of the molded product in axial alignment with and to correspond to the hole formed in the opposite wall of the grommet by the neck of the punch and the removal of flash from the peripheries of the grommets.

These trimming operations to remove flash and to punch out a hole to complete the grommet are obviously not conducive to accuracy of the molded product. The possibility of error naturally increases with each trimming operation and considerable spoilage was unavoidable with past molding equipment.

Moreover, defective molding equipment is not discernible with hitherto available molding apparatus until some time after the trimming of flash and the punching out operations have been completed, during which time many additional grommets of erroneous construction may have been molded.

The molding apparatus presently used is also objectionable by reason of the fact that whenever any portions of the punch or die, of which there may be a considerable number comprising one unit, become ineffective, replacement of the entire unit is necessary. This is especially true where the mold cavities which are nothing more than drilled holes in the die become distorted from excessive pressures in use.

Another object of this invention resides in the provision of novel molding apparatus by which the molding of grommets and other washer-like objects is greatly facilitated, and which overcomes all of the objections noted with previous molding equipment.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 2 is a fragmentary view of one of the core elements of the molding apparatus with parts thereof broken away and shown in section to illustrate the manner in which the grommets are molded thereon;

Figure 3 is a perspective view of one of the core elements showing the grommet forming parts thereof in disassembled relationship; and Figure 4 is a perspective view of a grommet of the type formed by the apparatus of this invention.

Figure 1:
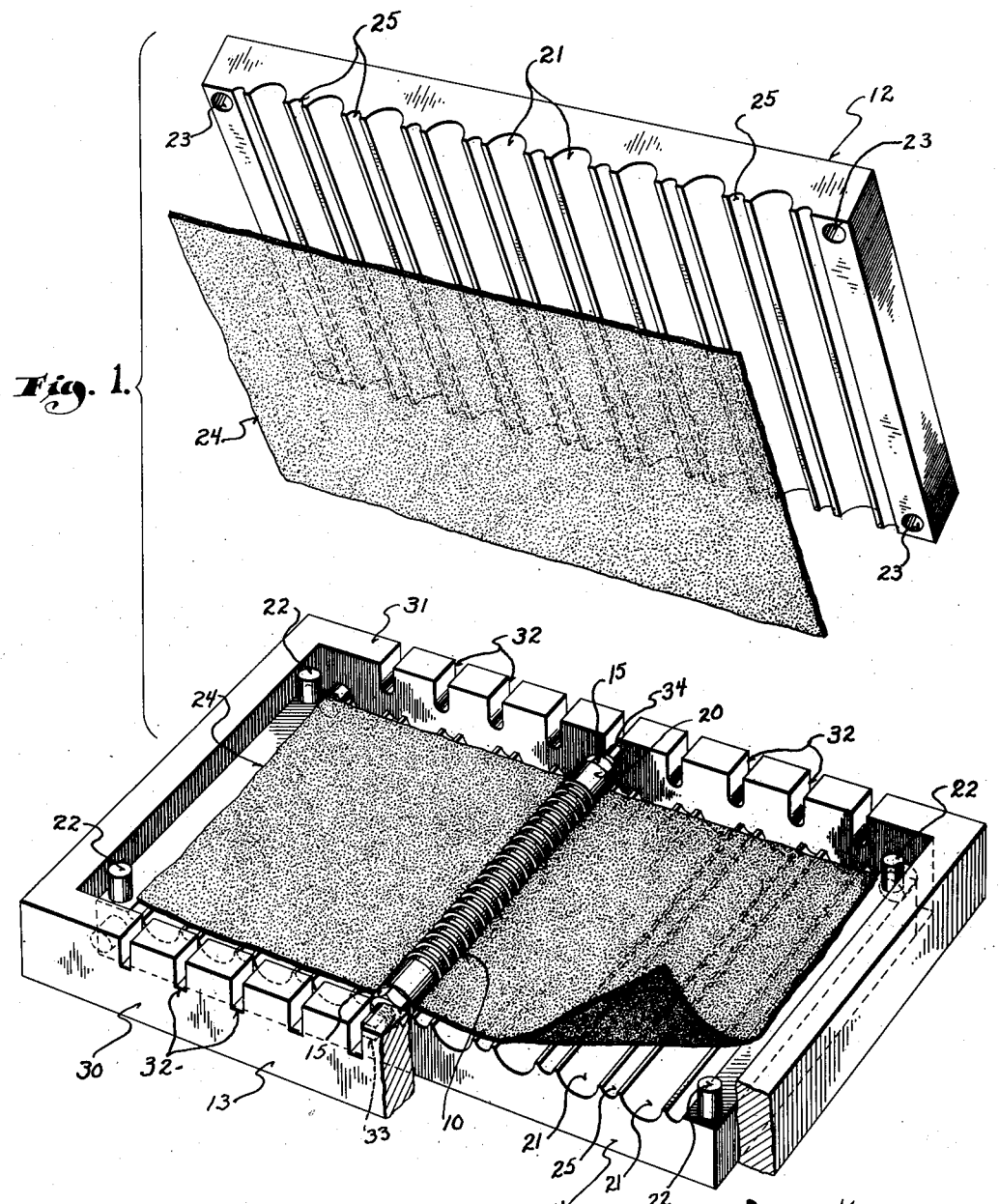
Figure 1 is a perspective view of the molding apparatus of this invention showing the cooperating parts thereof separated to better illustrate the method by which the grommets are formed.

As stated previously, grommets 5 of rubber or other flexible insulating material such as that shown in Figure 4 have been molded in the past by a method which entails pressing a punch having a substantially mushroom-shaped head into a well or mold cavity formed in a die to force molding material in the well radially outwardly and upwardly to cause the same to surround the mushroom-like head of the punch.

The number of trimming operations required to remove the excess molding material known as flash from the product thus molded renders this method highly objectionable. In addition, the grommet thus molded had but one hole in one side thereof and it was necessary to subject the same to a punching operation to provide the opposite wall of the grommet with an aperture similar to that molded therein.

Grommets made in this manner require no further trimming or dressing and have each radial flange thereof apertured identically to eliminate the necessity of stamping or punching out one of the apertures as was the case with past methods.

From the description thus far, it will be apparent that grommets made in accordance with the method of this invention have a high degree of uniformity and require little or no trimming.

The apparatus consists of one or more core elements 10, a pair of cooperating die shoes 11 and 12 for pressing the molding material into the grooves of the core elements, and a loading frame 13 for guiding and holding the core elements in predetermined positions with respect to the die shoes.

A typical core element 10 for forming rubber grommet-like objects comprises a rod 14 having its opposite end portions threaded to receive nuts 15 thereon. The medial portion of the core element has a number of flanges or washer-like elements of two diameters slidably received thereon. Washers of greater diameter are designated by the numeral 16 and those of lesser diameter bear the numeral 17. These washers are assembled on the core 14 in alternate fashion so that the washers 17 of lesser diameter lie between adjacent pairs of washers 16 of greater diameter.

Hubs 18 projecting from opposite faces of the washers 16 at the inner portions thereof engage the opposite sides of the washers 17 to hold the outer radial faces of the washer-like elements spaced apart as clearly shown in Figure 2 so that substantially channel shaped grooves are formed between adjacent pairs of washers 16 of greater diameter. These grooves have maximum depth at their axial extremities which overlie the hubs 18 and have least depth at their medial portions which overlie the peripheries of the washers 17 of lesser diameter.

These channel shaped grooves define the cross sectional shape of the grommets when the molding material is placed upon the periphery of the core element and pressed radially into the grooves thereof flush with the periphery of the core element.

The alternate pairs of washers or flanges 16 and 17 are detachably held assembled on the core rod 14 by being confined between a pair of collars 20 at the opposite ends of the bank of washers and against which the nuts 15 are threaded to tightly clamp the entire assembly together.

The collars 20 have substantially the same external diameter as that of the washers 16 of greater diameter, and the clamping action thereof against the bank of washers together with the fact that the washer-like elements substantially snugly fit the rod 14 assures maintenance of the washers against any shifting on the core rod.

In order to force the molding material into the peripheral grooves on the exterior surfaces of the core elements, the cooperating die shoes 11 and 12 are formed with a plurality of grooves 21 in their meeting faces. These grooves are substantially equispaced and registration thereof with one another is assured by engagement of dowel pins 22 at the corners of the lower die shoe 11 projecting upwardly from the top grooved surface thereof in suitable holes 23 drilled into the bottom face of the upper die shoe 12 at the corners thereof.

The registering grooves 21 are complementary to one another when the die shoes are brought together to form a substantially cylindrical mold cavity within which the core element or elements are snugly received. In other words, the core elements have an exterior diameter such as to fill the mold cavities formed by the complementary grooves 21 except at the peripherally grooved areas of the core elements which are adapted to receive the molding material to shape the same into the form of grommets. Thus, it will be seen that the walls of the mold cavities define only the outer peripheries of the grommets molded in the grooves of the core elements.

The molding material preferably comprises sheets of rubber or similar molding material 24, and a pair of such sheets is required for each molding operation.

To prepare the apparatus for molding, a sheet of molding material 24 is laid over the grooved upper face of the lower die shoe 11 so as to substantially cover the entire surface thereof. The core elements 10 are thereafter placed on top of the sheet of molding material over the grooves 21 of the die shoe 11 to carry the molding material into the grooves thereof.

When all of the core elements have been properly positioned within the grooves of the lower die shoe 11 a second sheet of molding material 24 is laid thereover to cover the core elements, and the upper die shoe 12 is next superimposed upon the lower die shoe to complete the "setup" of the apparatus.

Heat and pressure is then applied to the opposite sides of the die shoes to bring the same tightly together about the core elements located in the mold cavities formed by their respective grooves so as to reduce the molding material 24 to a state of plasticity enabling the same to be forced into the peripheral or annular grooves of the core elements to fill the same to a level substantially flush with the outer peripheral surface of the ungrooved portions of the core elements.

In order to assure complete filling of the peripheral grooves in the core elements it is desirable that a slight excess of molding material be provided. Previously, excess molding material in the dies was responsible for objectionable quantities of flash on the molded product requiring extensive trimming of the same and interfered with proper closure of the dies and consequently inaccuracies in the product.

The present apparatus does not prevent proper closure of the die shoes about the core elements by the presence of flash between the meeting faces of the die shoes and therefore enables accurate molding and minimizes trimming of the product after molding. Such improved results are obtained by the provision of flash receiving chambers between each mold cavity and which are formed by mating grooves 25 in the meeting faces of the die shoes between adjacent grooves 21 therein.

Inasmuch as the thickness of molding material used determines the amount of flash remaining after the molding operation it is desirable to use sheets of molding material 24 having a thickness to produce a minimum amount of flash and for this reason the flash grooves 25 are smaller in size than the grooves 21 forming the mold cavities.

After the molding operation the die shoes are separated and the core elements 10 removed therefrom with the molded objects remaining on their grooved exteriors. Should some flash be present on the exteriors of the core elements, the same may be readily removed before disassembly of the washers from the core rods by simply rubbing the peripheries of the core elements with sandpaper, emery cloth or any other suitable abrasive.

Subsequently to removing the flash from the exterior of the core elements the nuts 15 are backed off the core rods 14 and the stack of washers disassembled to enable removal of the grommets 5 from the grooves formed therebetween.

As shown in Figure 4, the grommets which result from the molding operation are substantially channel-shaped in cross section with the web of the channel providing the outer peripheral surface of the grommet and with the opposite side flanges projecting radially inwardly therefrom to terminate at the periphery of the holes formed by the hubs 18 of the washers 16 of greater diameter.

As previously stated, the molding apparatus of this invention makes it possible to produce grommets of channel-shape in a simpler and much more efficient manner, assuring a high degree of accuracy of the finished product.

It should be borne in mind, however, that the method of this invention is not limited to the production of channel-shaped objects such as grommets. Washer-like elements of many other cross sectional shapes and of molding material other than rubber may be as readily molded merely by altering the shape of the annular grooves formed between the washers 16 of larger diameter.

The molding material 24 may comprise natural or synthetic thermoplastic compounds such as cellulose acetate and other well-known materials capable of being molded under the application of heat and pressure thereto.

Other products capable of being molded by this apparatus include rings of various types, gaskets, packings of either chanel or V-shape, tires for toy vehicles, spacers of various types, and all sizes of tubing of various lengths as determined by the spaces between the opposing faces of washers of larger diameter on the core rods. In this later instance, the hubs 18 could be eliminated entirely.

As previously stated, the molding apparatus preferably includes a loading frame 13 which may be made integral with the lower shoe but which is shown as a hoop or band having a shape to telescope over the lower die shoe 11 with at least two opposite side rails 30 and 31 projecting slightly above the grooved face thereof and spaced from the sides of the shoe to accommodate the nuts 15 of the core elements between the rails 30 and 31 and the die shoe.

The rails 30 and 31 have a plurality of notches 32 cut therein and opening to the top side of the frame with the notches spaced apart a distance equal to the spacing between the grooves 21 of the die shoes and aligning with said grooves. These opposite notches are adapted to receive the extremities 33 and 34 of the core elements 10 which project outwardly beyond the threaded end portions of the core rods 14.

One end 33 of each of the core elements is preferably squared and substantially snugly received in the grooves 32 on one of the rails of the loading frame so as to preclude rotation of the core elements on their axes during the molding operation. The opposite ends 34 of the core elements may be made round if desired but also rather snugly fit their notches 32 in the opposite side rails of the loading frame to assure accurate alignment of the core elements with their respective grooves 21.

The loading frame shown is separate from the die shoes but has its inner periphery shaped to fit the ends of the shoe 11 so as to assure alignment of the notches 32 with the grooves 21 of the shoe. Although the rails of the loading frame project upwardly above the grooved face of the die shoe 11, they do not interfere with proper closure of the die shoes about the core elements during the application of heat and pressure to the shoes.

From the foregoing description taken in connection with the accompanying drawings, it will be readily apparent that the method and apparatus of this invention represents a vast improvement over past molding practice and equipment used in the production of grommets or other washer-like elements.

What I claim as my invention is:

1. A core element for insertion in a mold cavity to produce grommets, comprising: a rod; a multiplicity of washer-like elements of two diameters slidably received on the rod and arranged in pairs with one washer-like element of lesser diameter interposed between pairs of washer-like elements of greater diameter, said washer-like elements of greater diameter having hub portions cooperating to hold the outer sides of adjacent washer-like elements axially spaced apart to thereby give the exterior of the core element a grooved appearance with said grooves having greatest depth at opposite sides of the washer-like elements of lesser diameter and having least depth at the outer peripheries of the washer-like elements of lesser diameter; and means readily detachably received on the opposite end portions of the rod for drawing said washer-like elements axially together and for holding the same assembled on the rod, so that said grooves between the washers produce grommets of substantially channel-shaped cross section when the core element is placed in a substantially cylindrical mold cavity of a size to snugly receive the peripheral portions of the washers of greater diameter by the flow of molding material into said grooves, with the backs of the channels defined by the surfaces of the mold cavity.

2. A core element for insertion in a mold cavity to produce grommets, comprising: a rod, a multiplicity of washer-like elements of two diameters slidably received on the rod and arranged in pairs with washer-like elements of lesser diameter interposed between pairs of washer-like elements of greater diameter; hubs on the inner portions of alternate washer-like elements for holding the outer sides of adjacent washer-like elements axially spaced apart to thereby give the exterior of the core element a grooved appearance with said grooves having greatest depth at opposite sides of the washer-like elements of lesser diameter and having least depth at the outer peripheries of the washer-like elements of lesser diameter; and means readily detachably received on the opposite end portions of the rod for drawing said washer-like elements axially together and for holding the same assembled on the rod, said means including collars having an outer diameter substantially equal to that of the washer-like elements of greater diameter so that said grooves between the washers produce grommets of substantially channel-shaped cross section when the core element is placed in a substantially cylindrical mold cavity of a size to snugly receive the peripheral portions of the collars and washers of greater diameter by the flow of molding material into said grooves, with the backs of the channels defined by the surfaces of the mold cavity.

3. A core element for insertion in a mold cavity to produce annular objects, comprising: a rod; a plurality of washer-like elements of two diameters slidably received on the rod and arranged with one washer-like element of lesser diameter interposed between adjacent washer-like elements of greater diameter, said washer-like elements cooperating to define annular grooves the sides of which are defined by the larger washer-like elements, and the inner peripheries of which are defined at least in part by the washer-like elements of lesser diameter; and means readily detachably received on the opposite end portions of the rod for drawing said washer-like elements axially together and for holding the same assembled on the rod in side by side relationship, so that said grooves between the washers define annular mold cavities when the core element is placed in a substantially cylindrical mold cavity having a diameter substantially equal to that of the larger washer-like elements, the cylindrical wall of the mold cavity defining the outer wall of the annular mold.

4. Apparatus for molding washer-like objects from moldable material, comprising: readily separable superimposed die shoes having aligning grooves in their meeting faces adapted to cooperate to form a cylindrical mold cavity having a uniform diameter throughout its length; a rod; a plurality of washer-like elements adapted to be slidably received on the rod and having a diameter substantially equal to that of the cylindrical mold cavity; a plurality of washer-like elements of lesser diameter adapted to be slidably received on the rod, interposed between adjacent washer-like elements of greater diameter; and means readily detachably received on the opposite end portions of the rod for drawing said washer-like elements axially together in side by side relationship and for holding the same assembled on the rod to form a core element adapted to be placed in the cylindrical mold cavity with the walls of the cavity snugly embracing the peripheral portions of the washer-like elements of greater diameter, said core element and said mold cavity cooperating to define a plurality of individual axially spaced annular mold cavities.

5. Apparatus for molding grommets from moldable material, comprising: readily separable superimposed die shoes having aligning grooves in their meeting faces adapted to cooperate to form a cylindrical mold cavity having a uniform diameter throughout its length; a rod; a plurality of washer-like elements having a diameter substantially equal to that of the cylindrical mold cavity and adapted to be slidably received on the rod; a plurality of washer-like elements of lesser diameter adapted to be slidably received on the rod and interposed between adjacent ones of said first named washer-like elements to form a core element for insertion in the mold cavity; hubs on the inner portions of said first named washer-like elements having a lesser diameter than said smaller washer-like elements and adapted to hold the flat sides of adjacent washer-like elements axially spaced apart so that all of said washer-like elements, when received on said rod, cooperate to provide a core element, the exterior of which has a grooved appearance with said grooves having greatest depth at opposite sides of the washer-like elements of lesser diameter and having least depth at the outer peripheries of the washer-like elements of lesser diameter; and means readily detachably received on the opposite end portions of the rod for drawing said washer-like elements axially together and for holding the same assembled on the rod, said means including collars having an outer diameter substantially equal to that of the washer-like elements of greater diameter so that when the core element is placed in the mold cavity with the peripheral portions of the collars and washer-like elements of greater diameter snugly received in the cylindrical mold cavity the surfaces of the grooves and the walls of the mold cavity define the shape of the grommets to be molded.

6. A mold for producing a plurality of annular objects simultaneously, comprising: means defining a cylindrical mold cavity having a uniform diameter throughout its length; a rod having a length at least equal to the length of said mold cavity; a plurality of washer-like core elements, each having a diameter substantially equal to the diameter of the mold cavity and having a central hole in which said rod is adapted to be axially slidably received; a plurality of smaller washer-like core elements, each having a central hole through which said rod is adapted to be axially slidably received, said smaller washer-like elements having a diameter substantially smaller than said first-named washer-like elements; and means for releasably securing said washer-like elements along said rod in axial side by side relationship, with said smaller washer-like elements between adjacent ones of said first-named washer-like elements, said means enabling the rod and elements so secured to be releasably retained in said cylindrical mold cavity with said washer-like elements cooperating with one another and with the wall of the cylindrical mold cavity to define a plurality of axially spaced separate annular mold cavities.

CLARENCE H. STOWE.

REFERENCES CITED

The following references are of record in the file of this patent:

UNITED STATES PATENTS

| Number | Name | Date |
|---|---|---|
| 625,221 | Van den Bosch | May 16, 1899 |
| 1,354,738 | Gates | Oct. 5, 1920 |
| 1,576,184 | Freeman | Mar. 9, 1926 |
| 2,176,604 | Benkelman | Oct. 17, 1939 |
| 2,299,520 | Yant | Oct. 20, 1942 |